A. S. Cameron,
Steam Slide Valve.
No. 2,407. Reissued Dec. 4, 1866.
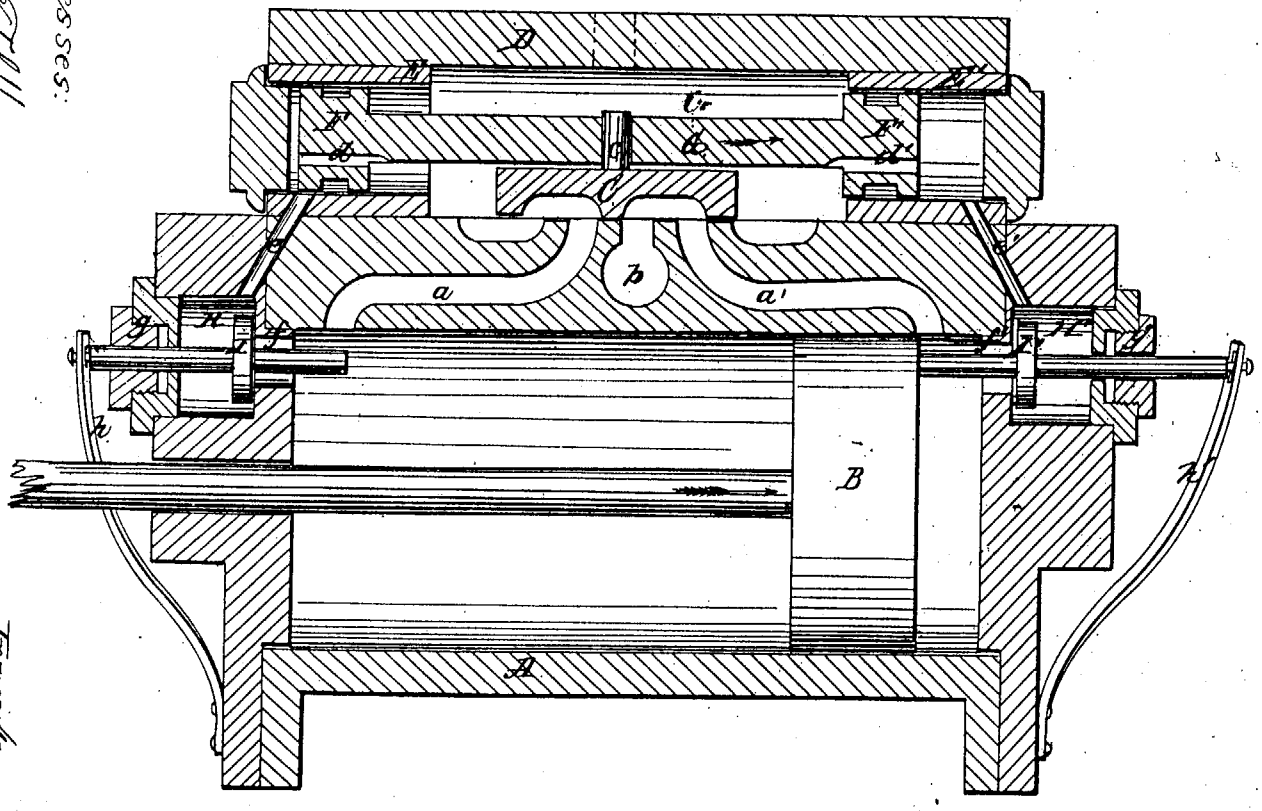
Witnesses:
C. L. Tiffoff
Thos Tuscott
Inventor:
A. S. Cameron

United States Patent Office.

IMPROVEMENT IN VALVE GEAR FOR STEAM ENGINES.

ADAM S. CAMERON, OF NEW YORK, N. Y.

*Letters Patent No.* 50,218, *dated October* 3, 1865; *reissue No.* 2,407, *dated December* 4, 1866.

SPECIFICATION.

TO ALL WHOM IT MAY CONCERN:

Be it known that I, A. S. CAMERON, of the city, county, and State of New York, have invented a new and useful Improvement in Valve Gear for Steam Engines; and I do hereby declare that the following is a full, clear, and exact description thereof, which will enable others skilled in the art to make and use the same, reference being had to the accompanying drawings, forming part of this specification.

The drawing represents a longitudinal central section of a steam cylinder constructed according to this invention.

This invention relates to a valve motion which is produced by the direct action of the steam piston on valves arranged in the cylinder-heads, the main valve being connected to secondary pistons which work in cylinders that are formed in the valve-chest. The action of the steam on these secondary pistons is governed by valves situated in the heads of the main cylinder, and acted upon by the main piston as the same approaches said heads, in such a manner that the main valve is thrown by the action of the steam itself, and with the least possible friction, and at the same time the main valve is reversed before the piston reaches the end of the cylinder, so as to cushion said piston.

A represents an ordinary steam cylinder provided with a piston, B. Steam is admitted to this cylinder through ports, *a a'*, and it exhausts through the port *b*, and these ports are opened and closed by the action of the slide-valve, C, which is of the ordinary construction, and which may be arranged so as to admit steam under the valve, as shown in the drawing, or which may be constructed in any other suitable manner. The slide-valve is seated on the bottom of the steam-chest, D, the ends of which form small cylinders, E E', to receive pistons F F', which are connected to each other by a rod, G, and this rod is perforated transversely so as to receive a stud, *c*, which rises from the back of the main valve, C. Small channels, *d d'*, passing through the secondary pistons, F F', form a communication between the interior of the steam-chest and the outer ends of the supplementary cylinders, E E', so that said secondary pistons are exposed to a uniform pressure of steam from all sides. The supplementary cylinders, E E', communicate through channels, *e e'*, with chambers, H H', which are formed in the heads of the main cylinder, and communicate with the interior of said cylinder by openings, *f f'*. These openings are closed by valves, I I', the stems of which extend out through stuffing-boxes, *g g'*, at one, and through the openings *f f'* at the opposite end, as clearly shown in the drawing. Springs *h h'*, which act on the outer ends of the valve stems, have a tendency to keep said secondary valves closed. The area of the cross-sections of the channels *e e'*, is much larger than that of the small channels, *d d'*, passing through the supplementary pistons, F F', and if the main piston approaches one end of the stroke, it strikes the stem of one of the secondary valves, I', (for instance,) and opens the same. The steam contained in the end of the supplementary cylinder, E', is thereby allowed to escape through the channel *e'*, port *a'*, and exhaust port *b*, and the equilibrium of the supplementary pistons, F F', is disturbed, causing said pistons to move in the direction of the arrow marked thereon in the drawing. By this motion the slide-valve is changed before the main piston has completed its stroke, and the steam admitted to the main cylinder cushions the piston and causes it to complete its stroke and to begin the return stroke with the least possible strain to the mechanism. As soon as the main piston begins its return stroke, the valve I' closes by the action of the spring *h'*, and the equilibrium of the small pistons is restored by the steam passing in through the small channel, *d'*. The same action takes place at the opposite end of the stroke of the main piston, and the slide-valve is changed automatically by the action of the steam itself, governed by the direct action of the main piston on the supplementary valves, I I', and a valve gear is obtained which works with the least possible friction, which is not liable to get out of order, and permits of running the main piston at a very rapid speed.

It is obvious that the means employed for disturbing the equilibrium of the secondary pistons can be changed in many different ways, and I do not wish to confine myself to the precise arrangement shown in the drawing.

What I claim as new, and desire to secure by Letters Patent, is—

1. The valves I I', in the heads of the main steam cylinder, A, to be operated by the direct action of the main piston, B, substantially as and for the purpose set forth.

2. The construction of the stems of the valves I I', at each end of the cylinder, in such a manner that said valves shall be moved, reversing the main valve before the piston reaches the end of the cylinder, so as to cushion or arrest the motion of the piston, as set forth.

3. The valve chambers H H', and valves I I', in the heads of the main cylinder, A, in combination with supplementary cylinders E E', pistons F F', and main valve C, constructed and operating substantially as and for the purpose described.

A. S. CAMERON.

Witnesses:

WM. F. MCNAMARA,